July 8, 1930.     C. BOCKIUS     1,769,984
PACKING FOR PISTONS, PLUNGERS, AND THE LIKE
Filed Oct. 2, 1925
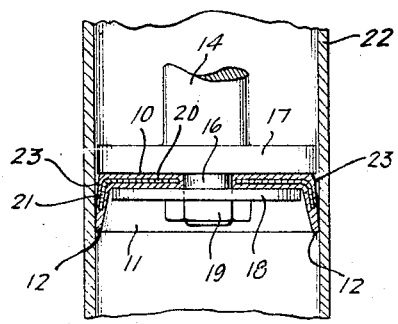
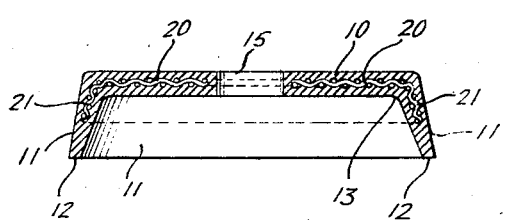
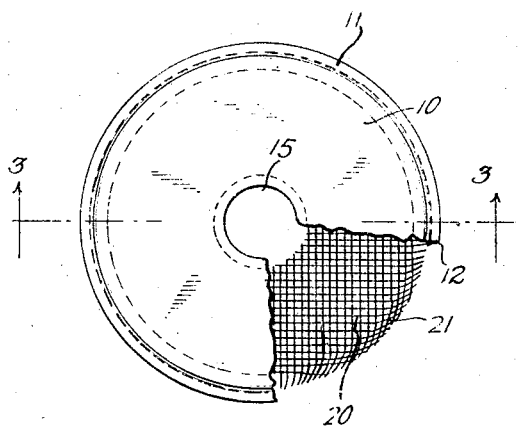
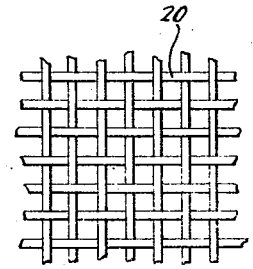
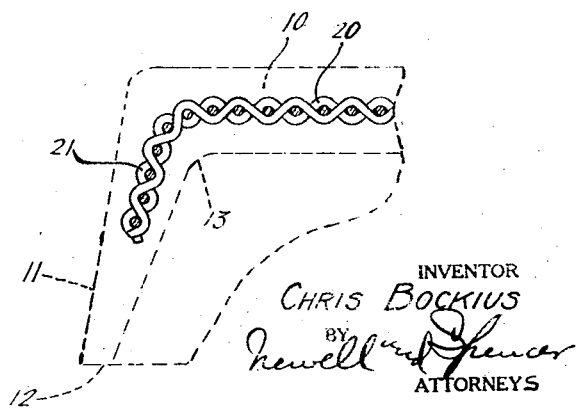
INVENTOR
CHRIS BOCKIUS
BY
ATTORNEYS Patented July 8, 1930

1,769,984

UNITED STATES PATENT OFFICE

CHRIS BOCKIUS, OF PASSAIC, NEW JERSEY, ASSIGNOR, BY MESNE ASSIGNMENTS, TO RAYBESTOS-MANHATTAN, INC., A CORPORATION OF NEW JERSEY

PACKING FOR PISTONS, PLUNGERS, AND THE LIKE

Application filed October 2, 1925. Serial No. 59,982.

This invention relates to piston or plunger packings and particularly to packings of the cup type, such as are customarily employed with pistons, pumps, hydraulic and air brakes, and similar structures using liquid or gas.

These packings which are made of various materials, such as leather, rubber and compositions, and which are usually cup-shaped and usually secured with the open side of the cup toward the liquid or fluid to be acted upon thereby, or which acts upon, the plunger or piston, are intended to provide a fluid-tight seal between the cylinder wall and the metallic part of the piston, and to this end are usually flared outward into engagement with the inner wall surface of the cylinder, the liquid or fluid pressure serving to maintain them in sealing relation to the wall when the packings are substantially in fluid-tight relation to the wall at the time the fluid pressure comes upon the piston.

Great difficulty has been experienced, however, with most packings used for the aforementioned purposes in maintaining the initial substantially fluid-tight engagement of the packing with the inner surface of the cylinder, with the result that the pumps or other structures in which the pistons or plungers operate, soon become leaky.

An object of the present invention is to provide a cup packing or washer for pistons or plungers, which will not require frequent replacement or readjustment and which will maintain its fluid-tight engagement with the cylinder wall of the structure with which the piston is associated over long periods of hard service, as, for example, in the hydraulic brakes of automobiles where assurance of effective operation is important.

The invention aims particularly to provide a cup packing of such construction and composition that it will both resist such distortions from the pressure of the attaching means as would affect its effectiveness when it is attached to the piston or plunger with which it is to be associated, and also resist permanent distortion from any irregularities in the movements of the piston or plunger, while at the same time it will so adapt itself to such irregularities of the plunger and piston movements as to maintain its sealing relation to the cylinder wall.

The invention aims further so to provide an effective packing composition, elastic in itself, with reinforcing means, preferably also elastic, as to insure maintenance of the original form of the packing, when not temporarily distorted, and of its tendency to return to the original form when distorted, over long periods of hard service, and furthermore to provide an elastic composition having the aforementioned characteristics which is also highly resistant to wear and cutting action of foreign material.

An important feature of the invention is the arrangement of the reinforcing means so as to prevent radial spreading of the material or even a cold flow of the packing material when subjected to the pressure of the means employed for securing the packing to the piston or plunger with which it is to be associated. Other objects and important features of the invention will appear from the following description and the claims, when considered in connection with the accompanying drawings, in which Fig. 1 is a sectional view through a piston or plunger and associated barrel or cylinder equipped with a cupped packing embodying the present invention;

Fig. 2 is a bottom plan view of a cupped packing embodying the present invention, with a portion broken away to show the arrangement of the reinforcing mesh;

Fig. 3 is a section on line 3—3 of Fig. 2;

Fig. 4 is a plan detail of the mesh used to reinforce the packing;

Fig. 5 is an enlarged sectional view of a portion of the reinforcing means, this figure showing in dotted lines the arrangement of the packing material with respect to the reinforcing means; and Fig. 6 is a transverse sectional view of a modified form of the invention.

In the illustrated embodiment of the invention, the cupped packing or washer comprises a substantially flat body portion 10 having an outwardly flared flange or rim 11 tapered at its junction with the body portion 10, so that its outer lip 12 is of less thickness than the thickness of the rim at 13, where it joins the body portion. The rim or flange 11 is preferably substantially uniformly flared on its inner and outer surface. The diameter of the body portion and the flange is slightly less than the internal diameter of the cylinder 22 in which the packing and its associated piston or plunger 17 travels so that a clearance 23 is provided between the top of the packing and the cylinder. The bottom part of the flange 11 is normally of a diameter greater than the internal diameter of the cylinder and presses tightly against the sides of the cylinder, giving a fluid-tight fit.

The material of which the illustrated packing is composed is preferably a special composition of rubber, which, while maintaining its elasticity over long periods of hard usage, will also resist wear and will not tend to take a permanent set. To prevent radial flow of the packing while subjected to the pressure of the attaching means, the flat portion 10 of the packing as well as a portion of the rim 11 is preferably reinforced with material which will hold the rubber against such flow or against permanent distortion. As herein shown, this reinforcing material preferably comprises a wire mesh, for example, of brass or other similar material, having considerable elasticity, and the reinforcing is shaped into the form of a cup before being embedded in or molded into the rubber, preferably substantially of the form of the cupped packing. The reinforcing is preferably not carried to the outer edge or lip of the rim 11, but is preferably carried a substantial distance into the flange or rim 11, although it will be understood that the invention is not restricted to the illustrated limits of the extent of this reinforcing.

In the illustrated embodiment of the invention, the reinforcing mesh is shown as comprising a cup having a substantially flat portion 20 corresponding to the flat portion or body 10 of the packing, and a flange or rim 21.

One manner of using the cupped packing is shown in Fig. 1. A piston or plunger rod 14 having a piston or plunger head 17 is provided with a reduced extension to receive the central opening 15 of the packing, this extension being threaded to receive a nut 19 which clamps the clamping plate or washer 18 against the inner surface of the packing, thereby clamping the flat or body portion 10 of the packing between the piston or plunger head 17 and the clamping plate 18.

With the packings heretofore made, without reinforcing means, this clamping action of the plate 18 against the head 17 would tend immediately to cause a lateral or radial expansion of the packing, thus tending to cause a binding against the inner wall of the cylinder or barrel 22, and even if the pressure were not sufficient to cause this immediate binding action, there would be a tendency for the material later to move radially, due to the constant pressure, a movement sometimes referred to as a "cold flow". The reinforcing mesh effectually prevents this and permits the initial and permanent shaping of the packing so as to provide a relief or clearance taper 23 to prevent bearing on the cylinder wall of the packing immediately adjacent to the plunger head, this clearance insuring more effective sealing action of the more flexible and more outwardly flared outer lip of the flange or rim 11.

As hereinabove suggested, the outer portion of the flange or rim 11 is preferably sufficiently flared so that the diameter of this portion of the packing is somewhat oversize, so that when forced into the cylinder or barrel 22, it will by its own resiliency press tightly against the inner surface and make an effectual fluid-tight seal. It will be seen that carrying the reinforcing up into the rim 11 provides an effective permanent support for this more flexible sealing part of the rim. The provision of a reinforced, permanently shaped cup extending substantially to the point where greater flexibility is required to accommodate the movements of the piston insures the whole structure against that permanent distortion which has caused the difficulty with prior constructions. By providing the clearance 23, the main part of the packing is also relieved of any strains tending to produce permanent distortion which would also affect the shape and position of the outer lip 12 supported thereby, and thus another cause of piston or plunger leaks in prior constructions is avoided.

In that form of the invention illustrated in Fig. 6, the packing comprises a substantially flat circular body portion 30 having a central opening 31. Projecting from the periphery of this flat circular body portion there is a flange 32 which flange is slightly flared in an outward direction. The outer peripheral portion of this flange 32 is thickened or enlarged as at 33, to a dimension slightly larger than the diameter with which it is to be associated in use. The inner face of the flange 32 and its thickened portion 33 is smooth or uninterrupted except for an annular channel 34 located at the rear of the thickened portion 33, and adapted to be received within said channel 34 there is a resilient member 35. This resilient member 35 at all times exerts a pressure outwardly and serves to maintain a fluid-tight joint between the thickened portion 33 and the element with which it is associated while the reduced diameter provided by the flange 32 affords the necessary relief for successful operation of the device.

By making the packing of rubber, for example, of comparatively high resilience and of long life, so far as wear is concerned, by making the reinforcing of metal of such strength and resilience as to cause it to maintain its original cup shape while yielding slightly to distorting strains, and by providing a predetermined oversize in the flare of the rim of the cup, I have succeeded in producing a cupped packing for plungers, pistons and the like, where heavy duty is required, which gives satisfactory service over long periods of hard usage.

The wire mesh from which the reinforcement is formed is preferably composed of relatively stiff but resilient non-corrodible wire, and the mesh is preferably of the type known as "double crimped". I have found that by using such a mesh the reinforcement will retain its original molded or stamped cup form, without distortion and without tendency to movement of the cross wires out of their normal rectangular relation to each other, and that when reinforcement of this construction is embedded in the packing material, it will effectively prevent spreading or permanent distortion of the main part of the cupped packing and also will provide an effective support for the more flexible lip which is intended to adapt itself to the plunger or piston movements.

As stated above, the material of which the illustrated packing is made constitutes a special composition of rubber such that after a long-continued use, the flange on the cup will not take a permanent set in the position which it occupies within the cylinder, but will always tend to assume its normal position so that it will constantly exert a considerable pressure on the inner wall of the cylinder. I have used the term "rubber" in the accompanying claims to include such rubber compositions. In actual practice it has been found that a cup in which the outer portion of the flange has an oversize diameter of ten thousandths (.010) of an inch for every inch in the circumference of the cylinder produces highly satisfactory and efficient results.

It is to be understood that the invention is not limited to the particular construction and arrangement of parts of the illustrated embodiment of the invention, but that the invention may be embodied in other forms within the scope of the claims.

What is claimed as new is:

1. A cupped piston or plunger packing comprising a substantially circular body portion having a centrally disposed opening, an outwardly flared flange on said body portion, and a wire mesh reinforcing element for said packing of similar form, the body portion and the flange of the reinforcing element being embedded in the corresponding portions of the cupped packing.

2. A cupped piston or plunger packing, comprising a body portion having an integral outwardly flared rim or flange, both formed mainly of rubber, a reinforcing element for said packing of similar form and embedded in the rubber of said body portion and flange, the rim or flange of said packing extending for a substantial distance beyond said reinforcing element to form a resilient outer portion that is more flexible than the reinforced portion, for engagement with the wall of the cylinder to which the packing is applied.

3. A cupped piston or plunger packing, comprising a body portion formed mainly of rubber, having an outwardly flared flange also formed mainly of rubber and comprising a relatively stiff reinforced supporting portion adjacent the body portion, and a resilient relatively flexible outer lip extending a substantial distance beyond the reinforced portion of the packing.

4. A fluid pressure unit comprising in combination a piston or plunger and a cupped piston or plunger packing formed mainly of rubber cooperating with the piston and comprising a body portion and a flange extending from said body portion, having a supporting part connected with the body portion and a flexible outer part, the diameter of the body portion and the adjacent portion of the flange being less than the internal diameter of the cylinder, and the flexible outer part of the flange having a larger normal diameter than the internal diameter of the cylinder.

5. A fluid pressure unit comprising in combination a cylinder, a piston or plunger and a cupped piston or plunger packing formed mainly of rubber cooperating with the piston and comprising a body portion provided with a conical flange having a supporting part connected with the body portion and a flexible outer part, the body portion of the packing and the adjacent portion of the flange having a diameter less than the internal diameter of the cylinder and the flexible outer part of the flange having a normal diameter greater than the internal diameter of the cylinder, and means for reinforcing said packing.

6. A fluid pressure unit comprising a cylinder and piston and a cupped piston packing formed mainly of rubber cooperating with the piston and comprising a body portion provided with a flange, the body portion and the adjacent portion of the flange having a diameter less than the internal diameter of the cylinder and the outer portion of the flange being relatively flexible and having a normal diameter greater than the internal diameter of the cylinder, and a reinforcing element for reinforcing the body portion and said flange embedded in the rubber of the body portion and flange and terminating in the portion of less diameter than the cylinder.

7. A cupped piston packing comprising a body portion and a flange portion each composed principally of rubber and a reinforcing member of wire mesh embedded in and extending substantially into said body portion and through at least a part of the flange portion.

8. A piston packing comprising a cup of permanently elastic rubber composition having a thin highly flexible lip, means molded into said cup adapted to stiffen said elastic means throughout the base of the cup and in the adjacent part of the flange thereof but not in the thin lip, the stiffened part of said flange being approximately equal to but slightly smaller in diameter than the cylinder in which it is to operate, and the portion of said flange beyond the edge of the stiffening means having a diameter about 1% greater than that of the cylinder in which it is to operate.

9. A piston packing comprising a rubber cup, the base and adjacent portion of the flange of which is relatively heavy and stiff and of a diameter substantially equal to but slightly smaller than that of the cylinder in which it is to operate and having an integral permanently elastic edge portion of said flange which is substantially thinner and more flexible than the rest of said cup, said thin portion flaring slightly outward to a diameter slightly greater than that of the cylinder in which it is to operate.

10. A cup packing for pistons of fluid pressure responsive apparatus comprising a stiff base and adjacent flange portion of diameter not greater than that of the cylinder in which it is to operate and a substantially more flexible lip on said flange made of permanently elastic rubber compound and being flared toward its edge to a maximum diameter, when unconfined, in the neighborhood of 1% greater than the diameter of the cylinder in which it is to operate.

11. In a fluid pressure responsive apparatus, a piston having a packing of elastic rubber, the body of which is of slightly smaller transverse dimensions than the diameter of the cylinder in which it operates and is supported against radial expansion which would cause it to bind against the walls of the cylinder when under operating pressure, and a peripheral flange of which terminates in a lip substantially more flexible than the body portion and appreciably greater in diameter at its outer edge, when unconfined, than the cylinder in which it operates.

Signed at New York city, N. Y., this 30th day of September, 1925.

CHRIS BOCKIUS.